(12) United States Patent
Reiley, Jr. et al.

(10) Patent No.: US 10,387,489 B1
(45) Date of Patent: Aug. 20, 2019

(54) SELECTING SONGS WITH A DESIRED TEMPO

(71) Applicant: Pandora Media, Inc., Oakland, CA (US)

(72) Inventors: David H. Reiley, Jr., Berkeley, CA (US); Andreas Ehmann, San Francisco, CA (US); Walker Phillips, San Francisco, CA (US); Myra Chachkin, Oakland, CA (US); Maria Cantu Chavez, Dublin, CA (US)

(73) Assignee: Pandora Media, Inc., Oakland, CA (US)

( * ) Notice: Subject to any disclaimer, the term of this patent is extended or adjusted under 35 U.S.C. 154(b) by 144 days.

(21) Appl. No.: 15/400,559

(22) Filed: Jan. 6, 2017

Related U.S. Application Data (60) Provisional application No. 62/276,717, filed on Jan. 8, 2016.

(51) Int. Cl.
*G06F 16/638* (2019.01)
*G06F 16/635* (2019.01)
*G06F 16/683* (2019.01)
*G06F 3/16* (2006.01)
*H04L 29/06* (2006.01)

(52) U.S. Cl.
CPC .............. *G06F 16/683* (2019.01); *G06F 3/16* (2013.01); *G06F 16/635* (2019.01); *G06F 16/639* (2019.01); *H04L 65/60* (2013.01)

(58) Field of Classification Search
CPC ......... G06F 17/30772; G06F 17/30058; G06F 17/30749; G06F 17/30752; G06F 17/30053
See application file for complete search history.

(56) References Cited

U.S. PATENT DOCUMENTS

| | | | |
|---|---|---|---|
| 2002/0037083 A1* | 3/2002 | Weare | G06F 17/30038 381/58 |
| 2008/0236370 A1* | 10/2008 | Sasaki | A63B 71/0686 84/612 |
| 2009/0178542 A1* | 7/2009 | Jochelson | G10H 1/40 84/609 |

(Continued)

OTHER PUBLICATIONS

Yamaha, "Yamaha BODiBEAT Music Player/Heart Rate Monitor," Amazon.com, First available at Amazon.com on Jul. 1, 2009, 6 pages, [online] [retrieved on Mar. 15, 2016] Can be retrieved from the internet <URL:http://www.amazon.com/Yamaha-BODiBEAT-Music-Player-Monitor/dp/B002G1YPLQ>.

(Continued)

*Primary Examiner* — Yuk Ting Choi
(74) *Attorney, Agent, or Firm* — Fenwick & West LLP (57) ABSTRACT

A media playlist is generated in which media items have a tempo matching a target tempo. The content server receives a seed value and a tempo signal from a client device. The tempo signal indicates a target tempo specified by the user. The content server calculates a target tempo range associated with the target tempo and generates a filtered playlist of media items based on the seed value and the target tempo range. The media items in the in the filtered playlist have tempos within the target tempo range. The content server provides the media items in the filtered playlist to the client device.

26 Claims, 5 Drawing Sheets

(56) References Cited

U.S. PATENT DOCUMENTS

2010/0162115 A1* 6/2010 Ringewald ........ G06F 17/30743
715/716
2014/0180762 A1* 6/2014 Gilbert .................. G06Q 30/02
705/7.29

OTHER PUBLICATIONS

"MPTrain: A Mobile Music and Physiology Based Personal Trainer," 3 pages, [online] [Archived on web.archive.org on Nov. 3, 2013] [Retrieved on Mar. 15, 2016] Can be retrieved from the internet <URL:http://web.archive.org/web/20131103014259/http://www.nuriaoliver.com/MPTrain/MPTrain.htm>.

Video for "Time-Scaling Running Shoe" 1 page, [online] [retrieved on Mar. 15, 2016] Retrieved from the internet <URL:http://www.music.mcgill.ca/~hockman/projects/beat-to-the-run/video.html>.

Moens, B., et al., "D-Jogger: Syncing Music With Walking," Abstract from SMC Conference, Jul. 29, 2010, Sounds and Music Computing, 2 pages, [online] [retrieved on Mar. 15, 2016] Can be retrieved from the internet <URL:http://smcnetwork.org/node/1398>.

The Echo Nest, "Echo Run Takes Jogging Apps to the Next Level," Blog, Mar. 1, 2013, 3 pages, [online] [retrieved on Mar. 15, 2016] Retrieved from the internet <URL:http://blog.echonest.com/post/44300889363/echoruntakesjoggingappstothenextlevel>.

\* cited by examiner

SELECTING SONGS WITH A DESIRED TEMPO

CROSS-REFERENCE TO RELATED APPLICATIONS

This application claims the benefit of and priority to U.S. Provisional Application No. 62/276,717, filed on Jan. 8, 2016, which is hereby incorporated by reference in its entirety.

BACKGROUND

Field of Disclosure

The present invention generally relates to the delivery of content, and more specifically to ways of generating media playlists in which media items have a tempo matching a target tempo specified by a user.

Description of the Related Art

Many users utilize their digital devices to consume digital content. For example, a user may use a media application on his or her digital device to play a media item with audio content (e.g., a song). The tempo of audio content describes the overall pace or speed at which the content is played, and is generally characterized with the number of beats per minute or the amount of time between successive beats. Sometimes, the user desires to control the playlist such that the playlist contains media items having a specified tempo. For example, a user that is jogging may prefer media items with faster tempos. In contrast, a user who is relaxing may prefer media items with slower tempos.

SUMMARY

The above and other issues are addressed by a method, computer-readable medium, and content server for generating a media playlist of media items matching a target tempo. An embodiment of the method comprises receiving a seed value and a tempo signal from a client device. The tempo signal indicates a target tempo. The method also comprises calculating a target tempo range associated with the target tempo and generating a filtered playlist of media items based on the seed value and the target tempo range. The media items in the filtered playlist have a tempo within the target tempo range. The method further comprises providing the media items in the filtered playlist to the client device.

An embodiment of the medium includes a non-transitory computer-readable medium storing executable computer program instructions for generating a media playlist of media items matching a target tempo. The computer program instructions comprise instructions for receiving a seed value and a tempo signal from a client device. The tempo signal indicates a target tempo. The instructions also comprise calculating a target tempo range associated with the target tempo and generating a filtered playlist of media items based on the seed value and the target tempo range. The media items in the filtered playlist have a tempo within the target tempo range. The instructions further comprise providing the media items in the filtered playlist to the client device.

An embodiment of the content server comprises a non-transitory computer-readable storage medium storing executable computer program instructions and a processor for executing the instructions. The computer program instructions comprise instructions for receiving a seed value and a tempo signal from a client device. The tempo signal indicates a target tempo. The instructions also comprise calculating a target tempo range associated with the target tempo and generating a filtered playlist of media items based on the seed value and the target tempo range. The media items in the filtered playlist have a tempo within the target tempo range. The instructions further comprise providing the media items in the filtered playlist to the client device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
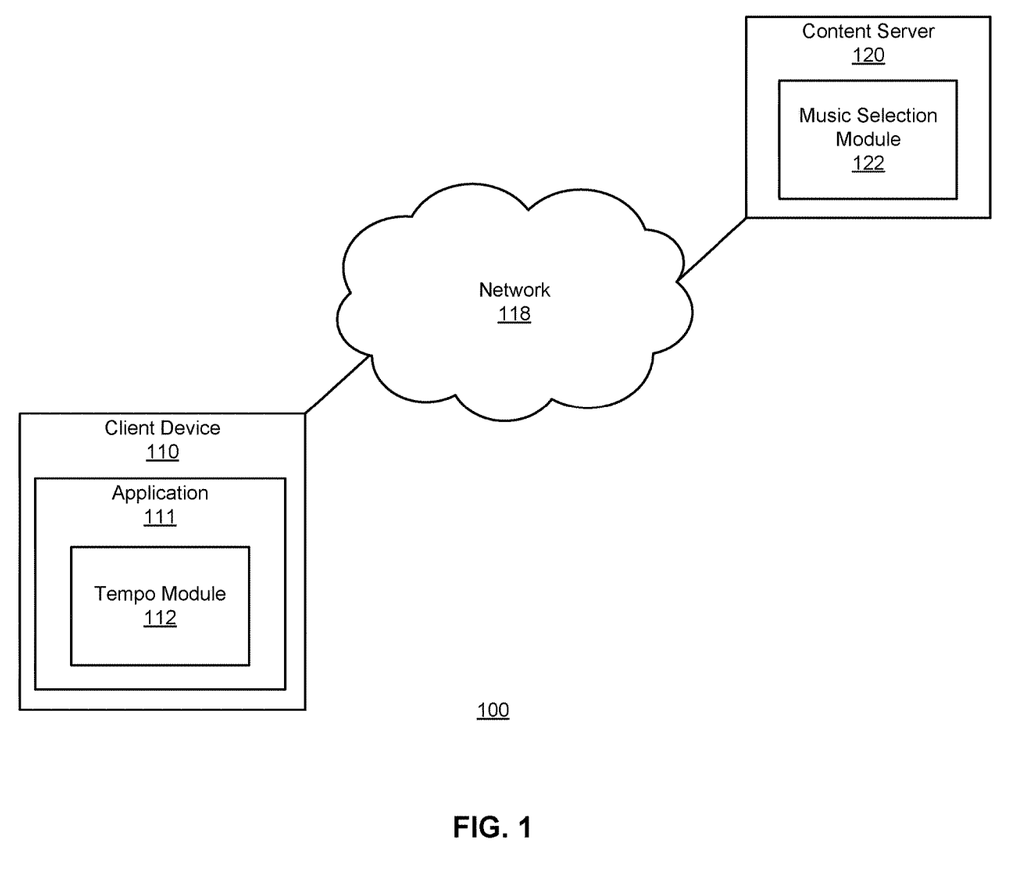
FIG. 1 is a high-level block diagram illustrating an embodiment of an environment for generating media playlists in which media items have tempos matching a target tempo.

FIG. 1 is a high-level block diagram illustrating an embodiment of an environment 100 for generating media playlists in which media items have tempos matching a target tempo. The environment includes a client device 110 connected by a network 118 to a content server 120. Here only one client device 110 and content server 120 are illustrated but there may be multiple instances of each of these entities. For example, there may be thousands or millions of client devices 110 in communication with one or more content servers 120.

The network 118 provides a communication infrastructure between the client devices 110 and the content servers 120. The network 118 is typically the Internet, but may be any network, including but not limited to a Local Area Network (LAN), a Metropolitan Area Network (MAN), a Wide Area Network (WAN), a mobile wired or wireless network, a private network, or a virtual private network.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to input and output sound (e.g., speakers and microphone) and images, connect to the network 118 (e.g., via Wifi and/or 4G or other wireless telecommunication standards), determine the current geographic location of the client devices 110 (e.g., a Global Positioning System (GPS) unit), detect and record a user's touch on the screen (e.g., capacitive or resistive touch sensors), and/or detect motion of the client devices 110 (e.g., via motion sensors such as accelerometers and gyroscopes).

The client device 110 includes an application 111 that allows interaction with the content server 120. For example, the application 111 could be a browser that allows a user of the client device 110 to obtain content by browsing a web site of the content server 120. As another example, the application 111 could be a dedicated application specifically designed (e.g., by the organization responsible for the content server 120) to enable interactions with the content server 120 and its content.

The application 111 presents media items, responsive to a user selecting and/or creating a particular media channel. In one embodiment, the user uses the application 111 to send a seed for a media channel to the content server 120. The seed describes what type of media channel the user would like formed. The value of a seed may be, e.g., a name of a song, a name of a band, a name of genre of music, a combination of these items, etc. The application 111 receives media items from the content server 120 (e.g., the media items are streamed) associated with the created media channel and presents the media items to the user. In one embodiment, the application 111 allows users to express preferences for media items received from the content server 120, and provides this information to the content server 120.

The application 111 also includes a tempo module 112 that allows a user to send a tempo signal specifying a target tempo to the content server 120. The media items received by the application 111 from the content server 120 have tempos matching the target tempo. The tempo signal may express the target tempo as a specific number of beats per minute, as a range of desired tempos, or in other ways.

An embodiment of the tempo module 112 includes a user interface that allows the user to specify the target tempo. For instance, the tempo module 112 may allow a user to input a numerical value of a tempo. The user interface may also display the current tempo of a playing media item and allow the user to increase or decrease the target tempo relative to the current tempo. The user may also specify the target tempo as a tempo signal using sensors on the client device 110. For instance, the tempo module 112 may allow the user to express a desired target tempo by tapping on the display screen of the client device 110 in a periodic manner. In this case, the tempo module 112 may determine the target tempo based on the rate at which the user taps the display. In another instance, the tempo module 112 may determine the target tempo by measuring movement signals (e.g., acceleration) of the motion sensors (e.g., accelerometers) in the client device 110 to capture movement of the client device 110 when a user is moving (e.g., walking or running). For example, the tempo module 112 may set the target tempo based on the rate of movement of the user or track changes in the rate of movement of the user by increasing or decreasing the target tempo as the user is moving faster or slower, respectively.

When the user specifies the target tempo as a series of sensor measurements, the tempo module 112 identifies characteristic time points in the tempo signal that are indicative of the start or end of a period, and uses the amount of time between successive time points to determine the characteristic period of the target tempo. For instance, the target tempo may be derived from a series of capacitance measurements generated by a user periodically tapping his/her finger on the display screen of the client device. Characteristic time points may be points with a capacitance measurement above a certain threshold.

In one embodiment, the tempo module 112 may take a function (e.g., average or median) of the amount of time between successive characteristic time points to determine the characteristic period of the target tempo. For example, such characteristic time points can be directly mapped to beats of a tempo, and the tempo module 112 may take the number of characteristic time points divided by the total sampling period to calculate the target tempo. The sampling period may be increased if the variance of the amount of time between successive characteristic time points is above a certain threshold.

The content server 120 includes a music selection module 122 that generates media channels that contain media items that have tempos matching specified target tempos. In one embodiment, the music selection module 122 receives a request for content from a client device 110. The request includes a seed and a tempo signal specifying a target tempo.

The music selection module 122 generates a media channel based on the seed. A media channel is a playlist of media items that are grouped together, where the media items share one or more common media features derived at least in part from the seed. A media item is a form of media content and is characterized by a set of media features that describe musicological features of the item (e.g., tempo, gender of singer, style). In one particular embodiment referred to throughout the remainder of the specification, the media item is audio content, such as a song, piece of music, or audio recording. It is appreciated, however, that in other embodiments a media item alternatively and/or additionally includes other forms of digital content, such as a video, movie, slideshow, or image. Thus, subsequent references to the media item or other audio-related terminology could equally apply to (for example) viewing videos or otherwise experiencing media provided by the content server 120 in other embodiments.

The music selection module 122 generates a filtered media channel having tempos that match the target tempo specified by the tempo signal. In one embodiment, the music selection module 122 filters a media channel generated based on the seed by discarding media items that have tempos not matching the target tempo. The music selection module 122 provides the media items in the filtered media channel to the requesting client device 110.

Figure 2:
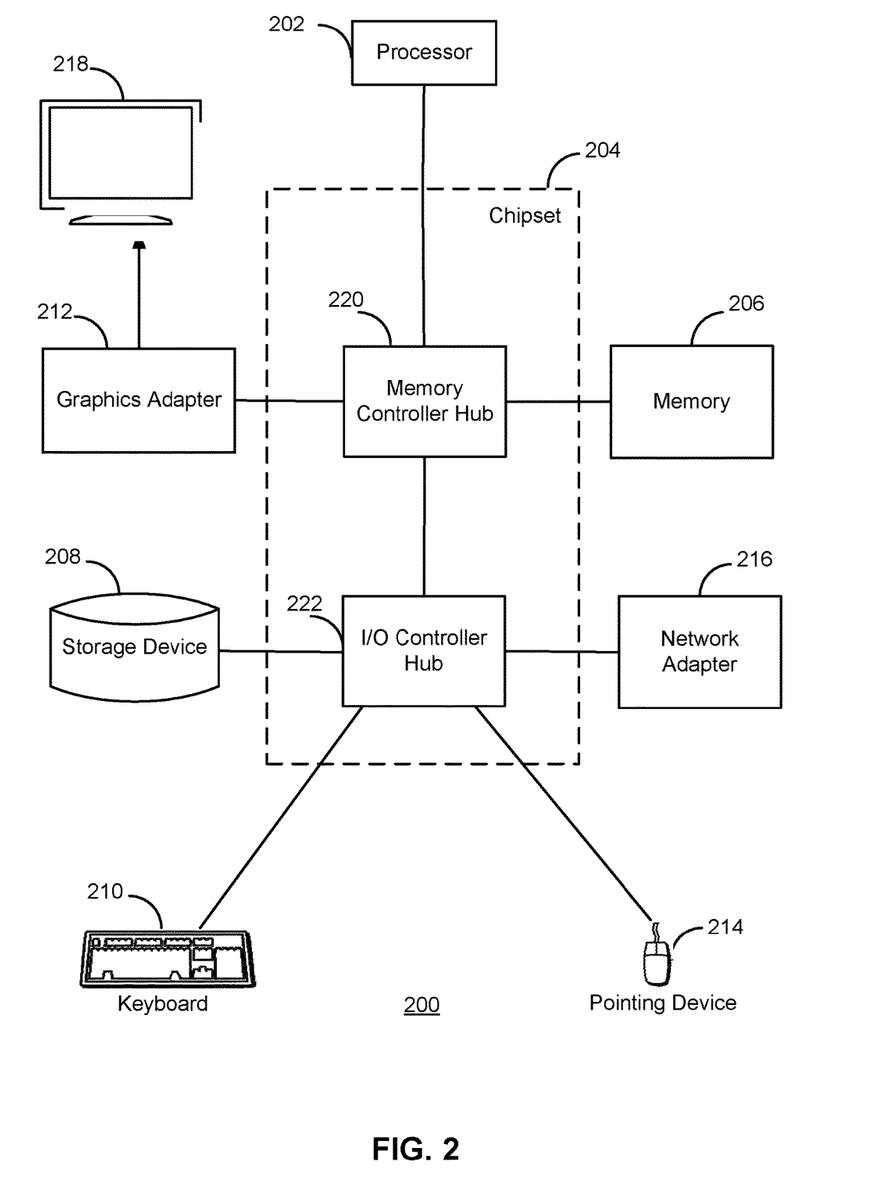
FIG. 2 is a high-level block diagram illustrating an example computer for implementing the client device and/or the content server of FIG. 1.

FIG. 2 is a high-level block diagram illustrating an example computer 200 for implementing the client device 100 and/or the content server 120 of FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, or some combination thereof, and is used to input data into the computer 200. In some embodiments, the computer 200 may be configured to receive input (e.g., commands) from the input interface 214 via gestures from the user. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. The computers 200 can lack some of the components described above, such as graphics adapters 212, and displays 218. For example, the content server 120 can be formed of multiple blade servers communicating through a network such as in a server farm.

Figure 3:
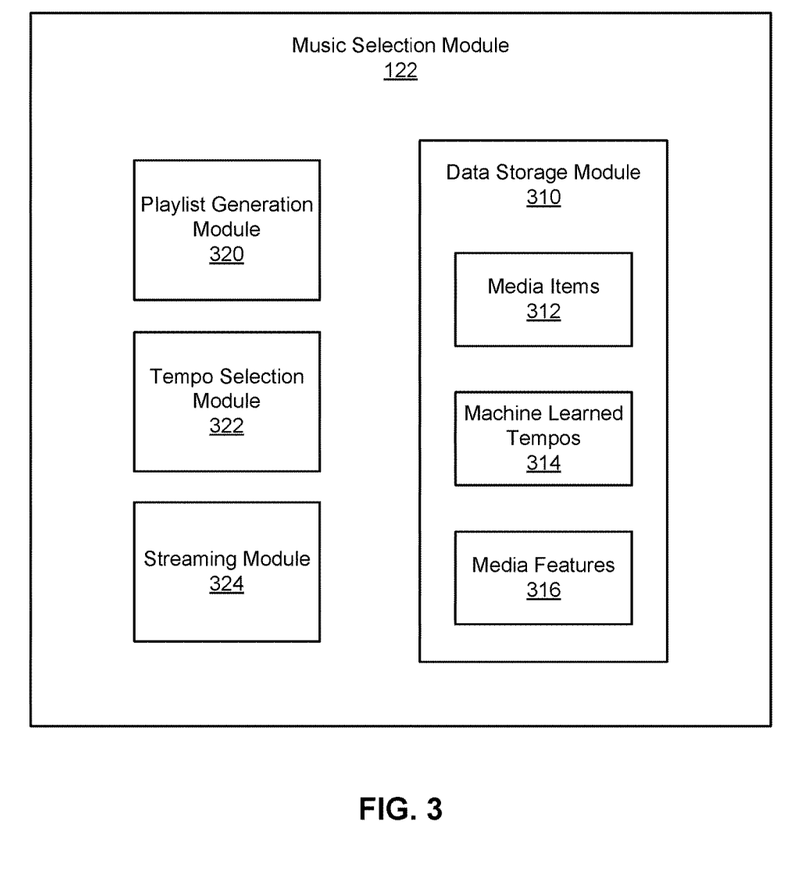
FIG. 3 is a high-level block diagram illustrating a detailed view of a music selection module of a content server, according to one embodiment.

FIG. 3 is a high-level block diagram illustrating a detailed view of the music selection module 122 of the content server 120, according to one embodiment. The music selection module 122 is comprised of modules including a data storage module 310, playlist generation module 320, tempo selection module 322, and streaming module 324. Some embodiments of the music selection module 122 have different modules than those described here. Similarly, the functions can be distributed among the modules in a different manner than is described here.

The data storage module 310 stores data used by the music selection module 122. The data include a library of media items 312, media features 316 of the media items 312, and machine-learned tempos 314 of the media items 312. The library of media items 312 includes media items that are available for providing to a client device 110. The machine-learned tempos 314 include estimated tempos of the media items 312 produced by analyzing audio signals of the media items 312.

The media features 316 include metadata (e.g., artist, name of track) for the media items in the library of media items 312 as well as musicological features that describe the musicological characteristics of the media items 312. For example, if the media item is a song, the media features 316 of the song may indicate the underlying musicological characteristics of the song such as e.g., the tempo as estimated by a human music analyst, the gender of the singer, the type of background vocals, the quality of the tones (e.g., pure or distorted), whether the melody dominates the composition, and an amount of gospel influence. A given media item may have many media features 316, such as 100-500 media features. In one embodiment, the mapping of media items to media features is established using the MUSIC GENOME PROJECT database created by PANDORA MEDIA, INC. of Oakland, Calif.

The tempo in the media features of a media item may be estimated by a human music analyst and may have a margin of error compared to the actual tempo of the media item. In one embodiment, the tempo in the media feature of a media item may be up to 10% faster or slower than the actual tempo of the media item.

The playlist generation module 320 generates media item playlists for media channels. The playlist generation module 320 receives a seed value from the user using a client device 110. The playlist generation module 320 extracts media features from the seed value using mappings of media items to corresponding media features. The playlist generation module 320 uses the media features 316 and the mappings of media items 312 to media features 316 to dynamically generate a playlist of media items having media features associated with the seed value. For example, given a seed value naming a band, the playlist generation module 320 identifies media features that characterize the band. The playlist generation module 320 then identifies songs with the same or similar media features. The playlist generation module 320 uses the identified songs to generate a media playlist which is associated with the band.

In another embodiment, the playlist generation module 320 generates media item playlists also based on features other than musicological features that improve media item recommendations for users. For example, in addition to identifying songs that have similar media features as the band, the playlist generation module 320 may take into account whether users have expressed preference for a media item, or demographic characteristics of users, such as gender, age, and the like of the users, when identifying songs for media playlists.

The tempo selection module 322 filters media playlists based on target tempos received from client devices 110. In one embodiment, the tempo selection module 322 receives a tempo signal specifying a target tempo from a client device 110 and receives the media playlist generated from the seed provided by the same client device 110. The tempo selection module 322 determines the tempo of each item in the media playlist and removes from the playlist items that have tempos not matching the target tempo. The tempo selection module 322 thus generates a filtered media item playlist having only media items with tempos matching the target tempo.

The streaming module 324 provides the media items in the filtered media item playlists to client devices 110. In one embodiment, the streaming module 324 streams the media items to the client devices 110. In other embodiments, the streaming module 324 provides the media items using different techniques, such as by providing the media items for download to the client devices 110 or providing the client devices with references to media items stored on the client devices.

Figure 4:
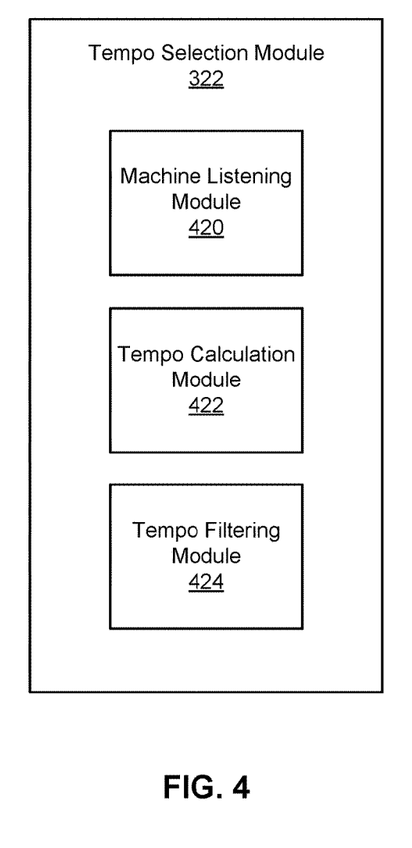
FIG. 4 is a block diagram illustrating a detailed view of a tempo selection module in the music selection module, according to one embodiment.

FIG. 4 is a block diagram illustrating a detailed view of a tempo selection module 322 in the music selection module 122, according to one embodiment. The tempo selection module 322 includes a machine listening module 420, a tempo calculation module 422, and a tempo filtering module 424. Some embodiments of the tempo selection module 322 have different modules than those described here. The functions can be also distributed among the modules in a different manner than is described here.

The machine listening module 420 analyzes the audio signals of media items and calculates machine-learned tempos for the media items. In one embodiment, the machine listening module 420 applies a low pass filter to the audio signal of a media item to attenuate high-frequency components and identify key low-frequency components that are indicative of the tempo of the media item. The key low-frequency components are used to extract the machine-learned tempo of the media item. For example, the machine listening module may identify periodic humps indicative of the beat in the media item.

The machine-learned tempo may be the actual tempo multiplied or divided by a constant factor. This difference between the machine-learned tempo and the actual tempo may arise due to errors or imprecision in the machine learning process. In one embodiment, the constant factor may be 2 and 3. As a result, the actual tempo of a media item could be the same as the machine-learned tempo, or the actual tempo could be ⅓, ½, 2×, or 3× of the machine-learned tempo.

In one embodiment, the machine-learned tempos for the media items in a media item playlist are calculated after the media item playlist is generated and responsive to a request for content from the client device 110. In another embodiment, the machine-learned tempos for the media items 312 are calculated before a given media item playlist is generated and stored in the machine-learned tempos 314 storage of the data storage module 310. For example, the machine-learned tempo for a media item may be calculated when the media item is initially added to the library of media items 312.

The tempo calculation module 422 receives the tempo signal from a client device 110 and calculates a target tempo range associated with the target tempo in the signal. Using the target tempo range expands the number of media items having the similar tempos that may be provided to the user of the client device 110. In one embodiment, the tempo calculation module 422 calculates the target tempo range as a margin below and above the target tempo. In one embodiment, the margin is 3%. Thus, the target tempo range in this embodiment extends from 3% slower than the target tempo to 3% faster than the target tempo. If the target tempo in the tempo signal is specified as a range, then the specified range is used as the target tempo range.

The tempo filtering module 424 filters the media item playlist to exclude media items with tempos outside the target tempo range calculated by the tempo calculation module 422. In one embodiment, the tempo filtering module 424 uses both the machine-learned tempo of the media item and the tempo in the media features of the media item to determine whether the media item has a tempo within the target tempo range.

Specifically, for a given media item, the tempo filtering module 424 determines the tempo specified by the media features for the media item (the "media feature tempo"). The tempo filtering module 424 then calculates an expanded range of the media feature tempo as a margin below and above the media feature tempo. In one embodiment, the margin for the media feature tempo is 10% and the media feature tempo range thus extends from 10% slower than the media feature tempo to 10% faster than the media feature tempo.

The tempo filtering module 424 determines whether the machine-learned tempo for the media item matches the media feature tempo range for the item. To determine whether the tempos match, the tempo filtering module 424 determines whether the machine-learned tempo is within the media feature tempo range. If the machine-learned tempo is not within the media feature tempo range, the tempo filtering module 424 determines whether a scaled value of the machine-learned tempo is within the range. Specifically, in the embodiment where the scale factor is 2 or 3, the tempo filtering module 424 determines whether a value that is ⅓, ½, 2×, or 3× of the machine-learned tempo is within the media feature tempo range. If the initial machine-learned tempo or a scaled machine-learned tempo is within the media feature tempo range, then the machine-learned tempo and the media feature tempo are considered to match.

If the machine-learned tempo and the media feature tempo for a media item in the playlist match, the tempo filtering module 424 determines whether the initial or scaled machine-learned tempo is within the target tempo range. If so, the tempo filtering module 424 retains the media item in the media item playlist. If the machine-learned tempo and the media feature tempo for the media item do not match, or the machine-learned tempo is outside of the target tempo range, the tempo filtering module 424 removes the media item from the playlist. Thus, the tempo filtering module 424 generates a filtered media item playlist wherein each media item has a tempo matching the target tempo.

Figure 5:
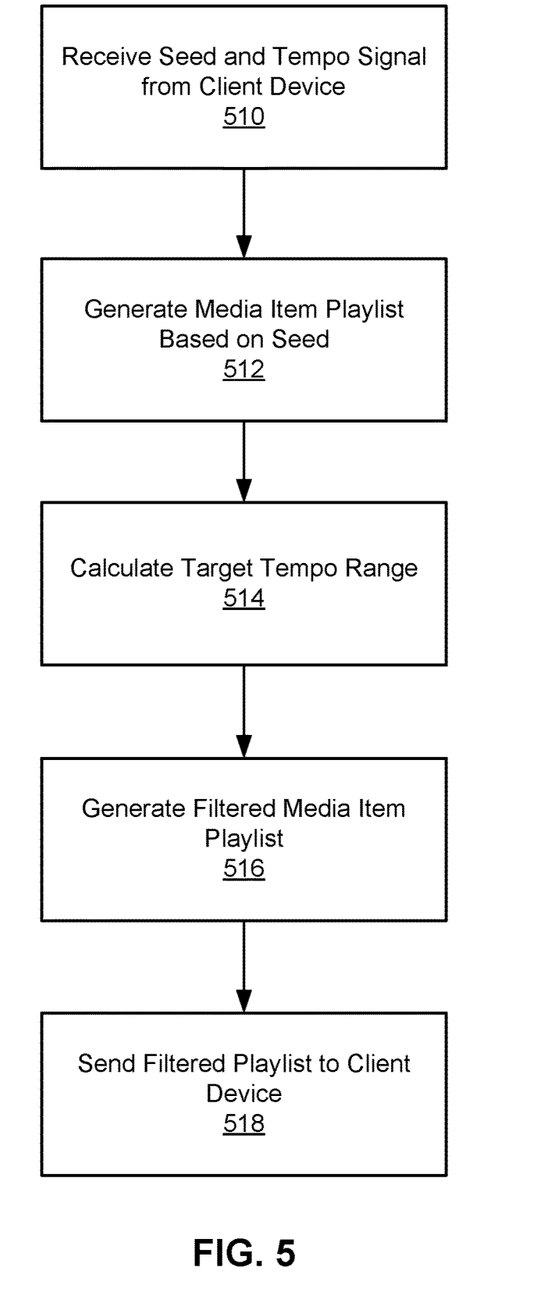
FIG. 5 is a flowchart illustrating a process of providing media items having desired tempos, according to one embodiment.

FIG. 5 is a flowchart illustrating a process of providing media items having desired tempos, according to one embodiment. In one embodiment, the process of FIG. 5 is performed by the content server 120. Other entities may perform some or all of the steps of the process in other embodiments. Likewise, embodiments may include different and/or additional steps, or perform the steps in different orders.

The content server 120 receives 510 a seed and a tempo signal from a client device 110. The tempo signal specifies a target tempo specified by the user of the client device 110. The content server 120 generates 512 a media item playlist based on the seed value provided by the client device 110. The content server 120 calculates 514 a target tempo range derived from the target tempo. The content server 120 generates 516 a filtered media item playlist that excludes media items having tempos outside of the target tempo range.

In one embodiment, the content server 120 generates 516 the filtered media playlist by comparing a media feature tempo for the media item with a machine-learned tempo to determine whether the two tempos match. If the tempos match, and the machine-learned tempo is within the target tempo range, the associated media item is retained in the filtered media item playlist. If the media feature tempo and the machine-learned tempo do not match, or the machine-learned tempo is outside of the target tempo range, the content server removes the associated media item from the playlist. The content server 120 provides 518 the filtered media item playlist to the client device 110.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for generating a media playlist of media items matching a target tempo, comprising:
   receiving a seed value and a tempo signal from a client device, the tempo signal indicating a target tempo;
   calculating a target tempo range associated with the target tempo;
   generating a filtered playlist of media items based on the seed value and the target tempo range, wherein the media items in the filtered playlist have a tempo within the target tempo range, wherein generating the filtered playlist comprises:
      identifying a media feature tempo for a media item in an initial playlist, wherein the media feature tempo is estimated by a human music analyst,
      identifying a machine-learned tempo for the media item in the initial playlist, wherein the machine-learned tempo is estimated by computer analysis,
      comparing the media feature tempo and the machine-learned tempo for the media item to determine whether the media feature tempo and the machine-learned tempo match, and
      discarding the media item from the initial playlist responsive to the media feature tempo and the machine-learned tempo not matching to generate the filtered playlist; and
   providing the media items in the filtered playlist to the client device.

2. The method of claim 1, wherein generating the filtered playlist comprises:
   generating an initial playlist of media items from a library of media items based on the received seed value;
   determining tempos of the media items in the initial playlist; and
   discarding media items having tempos outside the target tempo range from the initial playlist to generate the filtered playlist.

3. The method of claim 1, wherein comparing the media feature tempo and the machine-learned tempo comprises:
   scaling the machine-learned tempo to produce a scaled machine-learned tempo; and
   determining whether the scaled machine-learned tempo matches the media feature tempo.

4. The method of claim 3, wherein scaling the machine-learned tempo comprises:
   scaling the machine-learned tempo by a factor of 2, 3, 4, ½, ⅓, or ¼.

5. The method of claim 1, wherein calculating the target tempo range comprises:
   calculating the target tempo range as a margin below and above the target tempo.

6. The method of claim 1, wherein the received tempo signal is generated by the client device, and reflects movement of the client device or a user's periodic tapping on the client device.

7. The method of claim 1, wherein the received tempo signal is generated by identifying characteristic time points in a series of sensor measurements made by the client device, wherein intensity of sensor measurements for the characteristic time points are above a predetermined threshold.

8. The method of claim 7, wherein the sensor measurements are capacitive sensor measurements.

9. A non-transitory computer-readable storage medium storing executable computer program instructions for generating a media playlist of media items matching a target tempo, the computer program instructions comprising:
   receiving a seed value and a tempo signal from a client device, the tempo signal indicating a target tempo;
   calculating a target tempo range associated with the target tempo;
   generating a filtered playlist of media items based on the seed value and the target tempo range, wherein the media items in the filtered playlist have a tempo within the target tempo range, wherein generating the filtered playlist comprises:
      identifying a media feature tempo for a media item in an initial playlist, wherein the media feature tempo is estimated by a human music analyst,
      identifying a machine-learned tempo for the media item in the initial playlist, wherein the machine-learned tempo is estimated by computer analysis,
      comparing the media feature tempo and the machine-learned tempo for the media item to determine whether the media feature tempo and the machine-learned tempo match, and discarding the media item from the initial playlist responsive to the media feature tempo and the machine-learned tempo not matching to generate the filtered playlist; and
providing the media items in the filtered playlist to the client device.

10. The computer-readable storage medium of claim 9, wherein generating the filtered playlist comprises:
generating an initial playlist of media items from a library of media items based on the received seed value;
determining tempos of the media items in the initial playlist; and
discarding media items having tempos outside the target tempo range from the initial playlist to generate the filtered playlist.

11. The computer-readable storage medium of claim 9, wherein comparing the media feature tempo and the machine-learned tempo comprises:
scaling the machine-learned tempo to produce a scaled machine-learned tempo; and
determining whether the scaled machine-learned tempo matches the media feature tempo.

12. The computer-readable storage medium of claim 11, wherein scaling the machine-learned tempo comprises:
scaling the machine-learned tempo by a factor of 2, 3, 4, ½, ⅓, or ¼.

13. The computer-readable storage medium of claim 9, wherein calculating the target tempo range comprises:
calculating the target tempo range as a margin below and above the target tempo.

14. The computer-readable storage medium of claim 9, wherein the received tempo signal is generated by the client device, and reflects movement of the client device or a user's periodic tapping on the client device.

15. A content server for generating a media playlist of media items matching a target tempo, comprising:
a processor for executing computer program instructions; and
a non-transitory computer-readable storage medium storing computer program instructions executable to perform steps comprising:
receiving a seed value and a tempo signal from a client device, the tempo signal indicating a target tempo;
calculating a target tempo range associated with the target tempo;
generating a filtered playlist of media items based on the seed value and the target tempo range, wherein the media items in the filtered playlist have a tempo within the target tempo range, wherein generating the filtered playlist comprises:
identifying a media feature tempo for a media item in an initial playlist, wherein the media feature tempo is estimated by a human music analyst,
identifying a machine-learned tempo for the media item in the initial playlist, wherein the machine-learned tempo is estimated by computer analysis,
comparing the media feature tempo and the machine-learned tempo for the media item to determine whether the media feature tempo and the machine-learned tempo match, and
discarding the media item from the initial playlist responsive to the media feature tempo and the machine-learned tempo not matching to generate the filtered playlist; and
providing the media items in the filtered playlist to the client device.

16. The content server of claim 15, wherein generating the filtered playlist comprises:
generating an initial playlist of media items from a library of media items based on the received seed value;
determining tempos of the media items in the initial playlist; and
discarding media items having tempos outside the target tempo range from the initial playlist to generate the filtered playlist.

17. The content server of claim 15, wherein comparing the media feature tempo and the machine-learned tempo comprises:
scaling the machine-learned tempo to produce a scaled machine-learned tempo; and
determining whether the scaled machine-learned tempo matches the media feature tempo.

18. The content server of claim 17, wherein scaling the machine-learned tempo comprises:
scaling the machine-learned tempo by a factor of 2, 3, 4, ½, ⅓, or ¼.

19. The content server of claim 15, wherein calculating the target tempo range comprises:
calculating the target tempo range as a margin below and above the target tempo.

20. The content server of claim 15, wherein the received tempo signal is generated by the client device, and reflects movement of the client device or a user's periodic tapping on the client device.

21. The method of claim 1, wherein comparing the media feature tempo and the machine-learned tempo further comprises:
calculating a media feature tempo range as a margin below and above the media feature tempo; and
determining that the media feature tempo for the media item does not match the machine-learned tempo of the media item responsive to determining that the machine-learned tempo or a scaled value of the machine-learned tempo is outside the media feature tempo range.

22. The method of claim 21, wherein generating the filtered playlist further comprises:
for a second media item in the initial playlist with a second media feature tempo that matches a second machine-learned tempo of the second media item, discarding the second media item from the initial playlist responsive to determining that the second machine-learned tempo or a scaled value of the second machine-learned tempo of the second media item is outside the target tempo range.

23. The computer-readable storage medium of claim 9, wherein comparing the media feature tempo and the machine-learned tempo further comprises:
calculating a media feature tempo range as a margin below and above the media feature tempo; and
determining that the media feature tempo for the media item does not match the machine-learned tempo of the media item responsive to determining that the machine-learned tempo or a scaled value of the machine-learned tempo is outside the media feature tempo range.

24. The computer-readable storage medium of claim 23, wherein generating the filtered playlist further comprises:
for a second media item in the initial playlist with a second media feature tempo that matches a second machine-learned tempo of the second media item, discarding the second media item from the initial playlist responsive to determining that the second machine-learned tempo or a scaled value of the second machine-learned tempo of the second media item is outside the target tempo range.

25. The content server of claim 15, wherein comparing the media feature tempo and the machine-learned tempo further comprises:
   calculating a media feature tempo range as a margin below and above the media feature tempo; and
   determining that the media feature tempo for the media item does not match the machine-learned tempo of the media item responsive to determining that the machine-learned tempo or a scaled value of the machine-learned tempo is outside the media feature tempo range.

26. The content server of claim 25, wherein generating the filtered playlist further comprises:
   for a second media item in the initial playlist with a second media feature tempo that matches a second machine-learned tempo of the second media item, discarding the second media item from the initial playlist responsive to determining that the second machine-learned tempo or a scaled value of the second machine-learned tempo of the second media item is outside the target tempo range.

\* \* \* \* \*